United States Patent [19]
Treybig

[11] Patent Number: 4,575,542
[45] Date of Patent: Mar. 11, 1986

[54] THERMOSETTABLE POLYSTYRYLPYRIDINE PREPOLYMER TERMINATED WITH ETHYLENICALLY UNSATURATED GROUPS AND CURED PRODUCTS THEREFROM

[75] Inventor: Duane S. Treybig, Lake Jackson, Tex.

[73] Assignee: The Dow Chemical Company, Midland, Mich.

[21] Appl. No.: 726,554

[22] Filed: Apr. 23, 1985

[51] Int. Cl.$^4$ .................... C08F 283/04; C08G 2/26
[52] U.S. Cl. .................... 525/426; 525/428; 525/518; 525/519; 525/912; 528/246; 528/248
[58] Field of Search .............. 528/246, 248; 525/426, 525/428, 518, 519, 912

[56] References Cited

U.S. PATENT DOCUMENTS

| | | | |
|---|---|---|---|
| 3,562,223 | 2/1971 | Bargain et al. | 260/78 |
| 3,994,862 | 11/1976 | Ropars et al. | 260/67.5 |
| 4,163,740 | 8/1979 | Malassine et al. | 260/31.2 N |
| 4,362,860 | 12/1982 | Ratto et al. | 528/248 |
| 4,471,107 | 9/1984 | Peake | 528/248 |

FOREIGN PATENT DOCUMENTS 45-1265  1/1970  Japan .

OTHER PUBLICATIONS

"Effect of 2,5-Dimethylpyrazine on Aldehydes", *Berichte der Deutschen Chemischen Gesellschaft*, vol. 38, No. 3 (1905), pp. 3724–3728, by R. Franke.
"Poly-2,5-Distyrylpyrazine and its Properties", *Journal of Polymer Science:* Part A-1, vol. 7, pp. 2037–2049 (1969) by Fuyishige and Hasegawa.
"Solid State Photopolymerization", *Kozyo Gitjutsuin Sen'l Kozyo Shikensho Kenkyu Habaku*, Yokahawa, Japan, 1969, No. 86, pp. 1–12 by Hasegawa, Masaki.
"Structure and Properties of Poly-2,5-Distyrylpyrazine", *J. Polymer Sci.*, Part A-2, 1970, No. 8, pp. 1027–1037.
"Characterization of Cured Polystyrylpyridine by Model Compounds", *Journal of Applied Polymer Science*, vol. 26, pp. 1975–1987 (1981) by Hsu, Rosenberg, Parker and Heimbuch.
"Four-Center Type Photopolymerization in Solid State", by Masaki Hasegawa in *Polymer Chem.*, vol. 27, No. 302, pp. 337–349 (1970).
Mustafa and Hilmy, *J. Chem. Soc.*, 1947, pp. 1698–1699.
Shaw, *J. Chem. Soc.*, 1924, pp. 2363–2365.
Shaw and Wagstaff, *J. Chem. Soc.*, 1933, pp. 77–79.
"Four-Center Type Photopolymerization in the Solid State. I. Polymerization of 2,5-Distyrylpyrazine and Related Compounds", by Hasegawa, Suzuki, Suzuki and Nakanishi in *J. Polymer Sci.*, Part A-1, vol. 7, pp. 743–752.
"On α-Styrylpyridine", H. Baurath, *Ber.*, 20, 1887, pp. 2719–2720.
"Condensation of α- and γ-Methylpyridine Derivatives with Cinnamaldehyde", by Spath, Kubiczek and Dubensky, *Ber.*, 74B, pp. 873–879 (1941).
"On the Condensation of α:γ:α'-Trimethylpyridine with Benzaldehyde", by Konigs and Bentheim, *Ber.*, 38, pp. 3907–3911 (1905).
A Dissertation "Stereochemistry of Styrylpyridine Photodimers" by Stephen Edward Burkle, University of New Hampshire, 1973.

*Primary Examiner*—Theodore E. Pertilla
*Attorney, Agent, or Firm*—J. G. Carter

[57] ABSTRACT

Thermosettable compositions are disclosed which are prepared by reacting (A) a pyridine compound containing at least two substituent groups which have at least one hydrogen atom attached to a carbon atom which is attached to the ring or mixture of such pyridines; (B) at least one material having at least two aldehyde groups; and (C) at least one aldehyde containing at least one polymerizable unsaturated group; wherein components (A), (B) and (C) are employed in quantities which provide a mole ratio of (C):(B):(A) of from about 0.25:0.25:1 to about 4:4:1. These thermosettable compositions can be cured by heat and pressure or by homopolymerization in the presence of or by copolymerization with an N,N'-bis-imide. The compositions are useful as light weight fire resistant interior and exterior parts or panels for the aerospace and/or aircraft industry and the like.

21 Claims, No Drawings

THERMOSETTABLE POLYSTYRYLPYRIDINE PREPOLYMER TERMINATED WITH ETHYLENICALLY UNSATURATED GROUPS AND CURED PRODUCTS THEREFROM

BACKGROUND OF THE INVENTION

The present invention pertains to polymers prepared from substituted pyridines containing at least two substituent groups having a hydrogen atom attached to a carbon atom attached to the ring, aromatic polyaldehydes and an aldehyde containing at least one polymerizable unsaturated group.

U.S. Pat. Nos. 4,362,860 and 4,471,107 disclose the preparation of ethenyl(vinyl) terminated polystyrylpyridine from the condensation of pyridine having at least two methyl substituents, an aromatic dialdehyde and 2-methyl-5-vinylpyridine or 2-methyl-3-vinylpyridine. The resulting vinyl terminated polystyrylpyridine prepolymers could then be cured by an addition reaction via the unsaturated terminal groups, thereby eliminating the release of water vapor and resulting in composites or other cured articles which do not possess surface imperfections.

Vinyl termination of the polystyrylpyridine prepolymer in the present invention is performed with an aldehyde containing at least one polymerizable unsaturated group instead of with a methylvinylpyridine. As a consequence, the storage modulus of the cured vinyl terminated polystyrylpyridine prepared with the vinyl substituted aldehyde is higher at room temperature than that prepared with methylvinylpyridine in most cases. The vinyl terminated polystyrylpyridine prepolymer prepared with the vinyl substituted aldehyde is suitable as a novel comonomer for reaction with N,N'-bis-imide resins. The copolymerization of this vinyl terminated prepolymer with N,N-bis-imide resin occurs at a lower cure temperature than that of an N,N'-bis-imide resin alone, which results in energy conservation.

SUMMARY OF THE INVENTION

One aspect of the present invention pertains to a thermosettable composition which results from reacting
(A) a pyridine compound containing at least two substituent groups which have at least one hydrogen atom attached to a carbon atom which is attached to the ring or mixture of such pyridines;
(B) at least one material having at least two aldehyde groups; and
(C) at least one aldehyde containing at least one polymerizable unsaturated group;
wherein components (A), (B) and (C) are employed in quantities which provide a mole ratio of (C):(B):(A) of from about 0.25:0.25:1 to about 4:4:1, preferably from about 0.5:0.5:1 to about 1.5:1.5:1.

Another aspect of the present invention pertains to the products resulting from curing the aforementioned thermosettable reaction product by heat and pressure or by homopolymerization in the presence of N,N'-bis-imides or copolymerization with an N,N'-bis-imide.

DETAILED DESCRIPTION OF THE INVENTION

Suitable pyridines which can be employed herein include any pyridine which has at least two substituent groups which have at least one hydrogen atom attached to a carbon atom which is attached to the ring. Particularly suitable pyridines include, di-, tri- tetra- and pentaalkylpyridines such as, for example, 2,5-dimethylpyridine, 2,3,4-trimethylpyridine, 2,3,5-trimethylpyridine, 2,3,6-trimethylpyridine, 2,4,5-trimethylpyridine, 2-ethyl-3,5-dimethylpyridine, 4-ethyl-2,5-dimethylpyridine, 2,5-diethylpyridine, 2,3-dimethyl-6-(1-methylethyl)pyridine, 3,6-dimethyl-2-(1-methylethyl)pyridine, 2-methyl-6-propylpyridine, 2,5-dimethyl-6-propylpyridine, 3-ethyl-2,5,6-trimethylpyridine, 2,3,4,5-tetramethylpyridine, 2,3,4,6-tetramethylpyridine, 2,3,5,6-tetramethylpyridine, pentamethylpyridine, 2,5-dimethyl-3-pyridinamine, 3-chloro-2,5-dimethylpyridine, mixtures thereof and the like. 2-Methylpyridine, 3-methylpyridine, 4-methylpyridine, 2-ethylpyridine and 2-propylpyridine can be mixed or blended with pyridine having two or more alkyl groups to control the molecular weight of the prepolymer.

Suitable aldehydes which can be employed herein include any aldehydes which contain at least two aldehyde groups and no other substituent groups which would tend to interfere with the reaction of the aldehyde groups and the said substituent groups of the pyridine material. Particularly suitable aldehyde materials include, for example, those of the formula:

$$R + CH)_n \overset{O}{\underset{\|}{}} \quad (1)$$

wherein n=2 or more, and R is an aromatic group such as, for example,

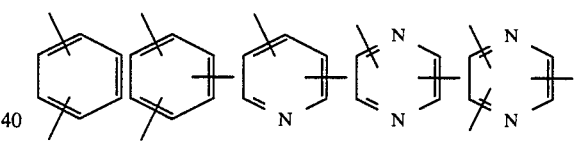

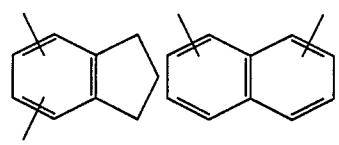

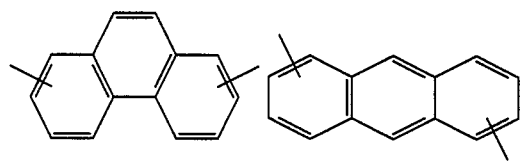

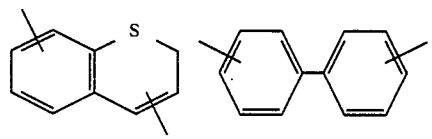

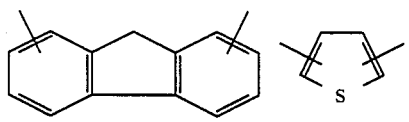

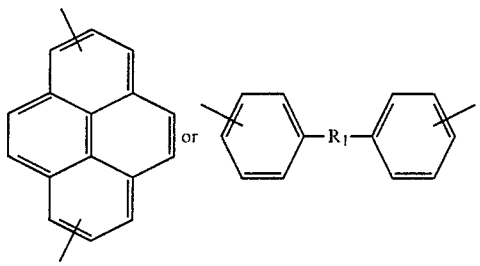

wherein $R_1$ is alkylene, oxygen, sulfur, oxyalkylene, polyoxyalkylene,

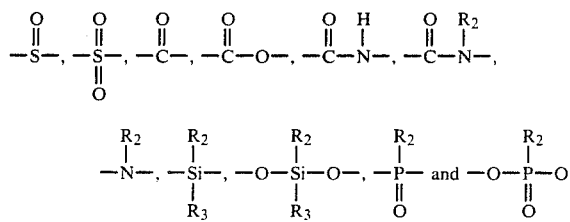

wherein $R_2$ and $R_3$ are alkyl, aryl or aralkyl, and substituted groups thereof.

Particularly suitable aldehydes include, for example, terephthaldicarboxaldehyde, o-phthalicdicarboxaldehyde, isophthalaldehyde, glyoxal, dicinnamylaldehyde, 2,5-pyrazinedicarboxaldehyde, 2,3,4,5-pyrazinetetracarboxaldehyde, 1,5-naphthalenedicarboxaldehyde, 1,2,4,5,7,8-naphthalenehexacarboxaldehyde, 1-bromo-2,5-naphthalenedicarboxaldehyde, 2-hydroxy-1,5-naphthalenedicarboxaldehyde, 2,6-phenanthrenedicarboxaldehyde, 2,7-pyrenedicarboxaldehyde, 4-chloro-2H-thiochromene-3,7-dicarboxaldehyde, 2,6-fluorenedicarboxaldehyde, 10-chloro-3,8-anthracenedicarboxaldehyde, 3,7-quinolinedicarboxaldehyde, 4,4'-bisbenzene-1-carboxaldehyde, 4,4'-oxy-bisbenzene-1-carboxaldehyde, 4,4'-(2,1-ethanediylbisoxy)-benzene-1-carboxaldehyde, 4,4'-sulfonylbisbenzene-1-carboxaldehyde, 4,4'-methylenebisbenzene-1-carboxaldehyde, and mixtures thereof.

Monoaldehydes such as benzaldehyde, o-tolualdehyde, trans-cinnamaldehyde, 3-chlorobenzaldehyde or p-anisaldehyde can be mixed or blended with a dialdehyde or mixture of dialdehydes to control the molecular weight of the prepolymer.

Ethenyl (vinyl) substituted aldehydes serve as termination agents. Suitable vinyl substituted aldehydes which can be employed herein include, for example, 4-(1-methylethenyl)-1-cyclohexene-1-carboxaldehyde (perillaldehyde); 5-norbornene-2-carboxaldehyde; 3-cyclohexene-1-carboxaldehyde; endo-bicyclo[3.1.0-]hex-2-ene-6-carboxaldehyde; acrolein; crotonaldehyde; trans-2-hexenal; 2,4-hexadienal; trans,trans-2,4-heptadienal; trans,trans-2,4-octadienal; trans,trans-2,4-nonadienal; 3,7-dimethyl-2,6-octadienal; 4-ethenylbenzaldehyde; 3,4-diethenylbenzaldehyde; 5-ethenylpyrazine-2-carboxaldehyde; 6-ethenylpyrazine-2-carboxaldehyde; 5-ethenylpyridine-2-carboxaldehyde; 4-(4-ethenylphenyl)-benzaldehyde; 4-(4-ethenylphenoxy)-benzaldehyde; and their mixtures.

The vinyl aldehyde terminated polystyrylpyridine prepolymers are prepared by condensing the alkyl substituted pyridine, aldehyde and ethenyl (vinyl) substituted aldehyde in a one or two step process. The one step process comprises condensing all three ingredients simultaneously. The two step process comprises
(1) condensing the alkyl substituted pyridine and aldehyde to form polystyrylpyridine oligomers and then
(2) condensing the polystyrylpyridine oligomers with the vinyl substituted aldehyde. The reactions of the two processes can be carried out neat or in the presence of a solvent. A solvent is preferred. Dehydration conditions are suitably provided by a dehydrating agent and/or a catalyst to activate the alkyl groups. In the presence of the vinyl substituted aldehyde, the condensation is carried out at a temperature of from 50° to about 140° C., preferably from 80° to 120° C. for about 1–48 hours (3600–172,800 s), preferably for 6 to 24 hours (21,600–86,400 s). In the absence of the vinyl substituted aldehyde, the condensation is carried out at a temperature of from about 50° to about 220° C., preferably from 120° to 180° C. for about 1–48 hours (3600–172,800 s), especially 6–24 hours (21,600–86,400 s).

Suitable solvents include acids, amides, ketones, ethers, chlorinated solvents, aromatic heterocycles containing no alkyl substituents and the like. Particularly suitable solvents include, glacial acetic acid, dimethylformamide, N,N-dimethylacetamide, N,N-diethylformamide, N,N-dimethylmethoxyacetamide, hexamethylphosphotriamide, N-methyl-pyrrolidinone, tetrahydrofuran, pyridine, mixtures thereof and the like.

Suitable catalysts which can be employed include, for example, acids, Lewis acids, bases or salts. Particularly suitable acids include, for example, sulfuric, hydrochloric or p-toluene-sulfonic acid. Particularly suitable bases include, for example, hydroxides of alkali or alkaline earth metals or of quaternary ammonium. Particularly suitable Lewis acids include, for example, boron trifluoride and the like. Particularly suitable salts include, for example, zinc chloride or aluminum chloride. The use of such catalysts is not indispensable but it reduces the time required for the reaction. The amount is e.g. of from about 0.1 to about 10 mole% with respect to the aromatic dialdehyde. If desirable, larger or lesser quantities can be employed.

The reaction can also be accelerated by certain substances such as methyl iodide, methyl sulfate, benzyl chloride etc., capable of forming with the pyrazinic base quaternary ammonium derivatives, such substances being usable in catalytic amounts or higher proportions.

Dehydrating agents such as acetic anhydride, trifluoroacetic anhydride, propionic anhydride and the like can promote the reactions and its action can be sufficient to render superfluous the incorporation of a catalyst. The amount of anhydride used ranges from 1 to 10, preferably 1.1 to 5 moles per mole of vinyl termination agent. The preferred dehydrating medium is a mixture of glacial acetic acid and acetic anhydride. The acetic acid and acetic anhydride can be removed by distillation, solvent extraction, solvent fractionation or by neutralization with a base. Examples of several solvent fractionation methods are described in U.S. Pat. Nos. 4,362,860 and 4,471,107 which are incorporated herein by reference. Suitable bases include sodium hydroxide, ammonia hydroxide and ammonia.

The reactions are usually conducted either under reduced pressure or in an inert atmosphere such as, for example, nitrogen, helium, neon, zenon, argon, mixtures thereof and the like.

The thermosettable prepolymers or resins of the present invention can be cured as is with the application of heat and pressure, or they can be dissolved in a suitable solvent or mixture of solvents and employed to saturate various reinforcing materials so as to prepare composites therefrom through the application of heat and pressure.

Suitable solvents which can be employed for preparing these composites include, for example, ketones, acetates, alcohols, ethers, hydrocarbons and the like. Particularly suitable solvents include, for example, acetone, methylethylketone, ethyl acetate, methylene chloride, trichloroethylene, tetrahydrofuran, chlorobenzene, ethanol, n-propanol, N-methyl-pyrrolidinone, dimethylformamide, dimethylacetamide, nitrobenzene, mixtures thereof and the like.

Suitable reinforcing materials include, for example, glass fibers, aramid fibers, carbon or graphite fibers and the like in any form such as, for example, matt, woven or fibrous form. Any synthetic or natural fiber materials can be employed as the reinforcing material.

The thermosettable prepolymers can be used according to various conventional techniques applicable to thermosetting resins. Powdered prepolymers are especially adapted for shaping by pressure-molding, but they can also be dissolved in a solvent or be employed in molten form. They can be used in the preparation of laminates or composites, molded articles, films, coatings 1,1'-(1,2-ethanediyl)bis-1H-pyrrole-2,5-dione; 1,1'-(1,6-hexanediyl)bis-1H-pyrrole-2,5-dione; 1,1'-(1,4-phenylene)bis-1H-pyrrole-2,5-dione; 1,1'-(1,3-phenylene)bis-1H-pyrrole-2,5-dione; 1,1'-(methylenedi-4,1-phenylene)bis-1H-pyrrole-2,5-dione, [1,1'-(methylenedi-4,1-phenylene)bismaleimide]; 1,1'-(oxydi-4,1-phenylene)bis-1H-pyrrole-2,5-dione; 1,1'-(sulfonyldi-4,1-phenylene)bis-1H-pyrrole-2,5-dione; 1,1'-(methylenedi-4,1-cyclohexanediyl)-bis-1H-pyrrole-2,5-dione; 1,1'-[1,4-phenylenebis(methylene)]bis-1H-pyrrole-2,5-dione; 1,1'-[(1,1-dimethyl-3-methylene-1,3-propanediyl)di-4,1-phenylene]bis-1H-pyrrole-2,5-dione; 1,1'-[(1,3,3-trimethyl-1-propene-1,3-diyl)di-4,1-phenylene]bis-1H-pyrrole-2,5-dione; and Technochemie's H-795 resin. Technochemie's H-795 resin is represented by the formula:

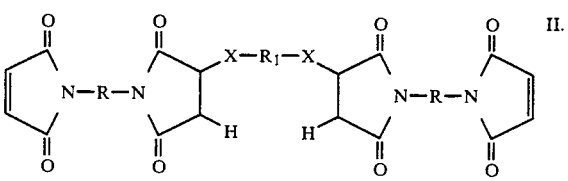

wherein R is an aromatic ring and $X-R_1-X$ is a Michael addition coupling group. Technochemie's M-751 resin is a "eutectic" mixture of

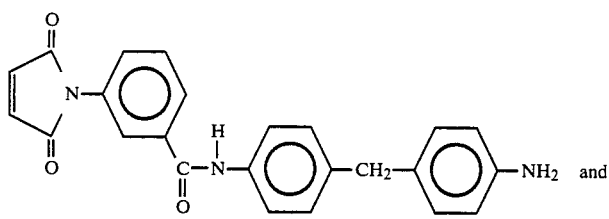

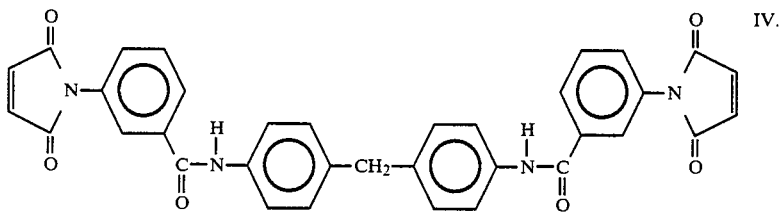

and the like.

The prepolymer is advantageously set by a thermal treatment at a temperature of from about 100° to about 300° C. Finally there is obtained a non-fusible and non-soluble polymer. Said polymer has a good thermal stability.

The vinyl aldehhyde terminated polystyrylpyridine prepolymer can be homopolymerized (blended) in the presence of an N,N'-bis-imide or copolymerized with an N,N'-bis-imide of the formula:

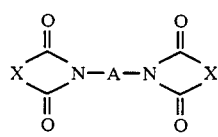

in which X represents a divalent radical containing a carbon-carbon double bond and A is a divalent radical having at least 2 carbon atoms. Preferred N,N'-bis-imides which may be employed include, for example, Many of these and other suitable N,N'-bis-imides which can be employed herein are disclosed in U.S. Pat. No. 3,562,223 which is incorporated herein by reference.

The compositions of the present invention are useful as light weight fire resistant interior and exterior parts or panels for the aerospace and/or aircraft industry; automotive, aerospace and/or aircraft engine parts and the like.

The following examples are illustrative of the present invention, but are not to be construed as to limiting the scope thereof in any manner.

EXAMPLE 1

2,4,6-Trimethylpyridine (40.41 g, 0.33 mole), terephthaldicarboxaldehyde (67.3 g, 0.5 mole), and acetic acid (60.7 g, 1.01 moles) were weighed into a 1 liter resin kettle equipped with an immersion thermometer, mechanical stirrer, nitrogen gas purge system and condenser. After the reactants were deoxygenated by stirring for fifteen minutes (900 s) in a nitrogen atmosphere, acetic anhydride (104.6 g, 1.02 moles) was added to the resin kettle. The reactants were heated to 140° C. and allowed to reflux for 6 hours and 52 minutes (24,720 s). Then the reaction mixture was cooled to below 98° C., and 4-(1-methylethenyl)-1-cyclohexene-1-carboxaldehyde (75 g, 0.5 mole) and 2,4,6-collidine (62.2 g, 0.51 mole) were added to the resin kettle. The reactor contents were heated between 117°–124° C. for an additional 22 hours (79,200 s). After the resultant red orange colored liquid was cooled to 77° C., the stirring reactor contents were neutralized with an aqueous solution of 9.9 wt/wt% of sodium hydroxide (417 g). The sodium hydroxide solution was decanted, deionized water (1417 g) added to the orange colored 1-methylethenyl terminated polystyrylpyridine prepolymer, the water decanted, deionized water (1473 g) added to the prepolymer and the water decanted. Finally, the prepolymer was stirred in deionized water (1343 g) for 34 minutes (2040 s) and the water decanted. The mustard yellow viscous liquid was dried in an oven under full vacuum between 70°–132° C. for 23 hours 11 minutes (83,460 s) giving a yellow brown colored soft solid.

EXAMPLE 2

The yellow brown colored soft 1-methylethenyl terminated polystyrylpyridine prepolymer from Example 1 was dried in an oven under full vacuum between 117°–215° C. for 6 hours 1 minute (21,660 s). The resultant dark brown colored solid was crushed with mortar and pestle and then sieved with a U.S.A. Standard Testing Sieve No. 40 to give a fine golden brown powder. The golden brown powder softened between 168°–191° C. and melted at 260° C. The 1-methylethenyl terminated prepolymer was compression molded between 176°–196° C. and 4380–5000 psi (30,200–34,475 kPa) for 1 hour (3600 s) and then between 200°–280° C. and 4380–4600 psi (30,200–31,717 kPa) for 1 hour 6 minutes (3960 s) with a Carver Laboratory press, employing a silicone mold release agent. Thermogravimetric analysis of the cured polymer in nitrogen showed 5% weight loss at 422° C. and 42.2% weight loss at 950° C. In air, the polymer lost 5% weight at 406° C. Dynamic mechanical analyses was performed between −160° to 400° C. in the torsional rectangular mode with an oscillatory frequency of 1 hertz and 0.05% strain. The polymer exhibited a gamma transition ($T_\delta$) temperature at −91° C. and storage modulus (G′) of $1.11 \times 10^{10}$ dynes/cm$^2$ at 25° C. The flexural modulus was calculated to be 482,973 psi (3330 MPa) from the storage modulus using the equation of Young's modulus.

EXAMPLE 3

Technochemie Compimide 795 was dried in an oven under full vacuum at 130° C. for 1 hour (3600 s). The 4-(1-methylethenyl)-1-cyclohexene-1-carboxaldehyde terminated polystyrylpyridine from Example 1 was dried in an oven under full vacuum between 117°–188° C. for 5 hours 40 minutes (20,400 s). The dried Technochemie Compimide 795 (0.89 g) and the dried 4-(1-methylethenyl)-1-cyclohexene-1-carboxaldehyde terminated polystyrylpyridine (0.9 g) were crushed and mixed with mortar and pestle giving a golden colored powder. In a differential scanning calorimetry analysis, the golden powder sealed in a glass ampule exhibited an exotherm of 115 joules/gram that started at 132° C., peaked at 209° C. and ended at 292° C. The dried Technochemie Compimide 795 alone exhibited an exotherm of 282 joules/gram that started at 120° C., peaked at 256° C. and ended at 332° C. This differential scanning calorimetry experiment demonstrates that the 1-methylethenyl terminated polystyrylpyridine prepolymer lowered the cure temperature of the Technochemie Compimide 795 by 47° C.

A mixture of the dried Technochemie Compimide 795 and dried 1-methylethenyl terminated polystyrylpyridine prepolymer was oven cured under full vacuum between 102°–161° C. for 17 minutes (1020 s). The resultant partially cured copolymer was crushed with a mortar and pestle and sieved with a U.S.A. Standard Testing Sieve No. 40 to give a golden brown powder. The golden brown powder softened between 167°–280° C. This powder was compression molded between 180°–199° C. and 5750–6050 psi (39,646–41,715 kPa) for 52 minutes (3120 s) and then between 240°–277° C. and 5780–5880 psi (39,853–40,543 kPa) for 1 hour 12 minutes (4320 s) with a Carver Laboratory press as described in Example 2. Thermogravimetric analysis of the cured copolymer in nitrogen showed 5% weight loss at 392° C. and 53.3% weight loss at 950° C. In air, the copolymer lost 5% weight at 389° C. Dynamic mechanical analyses showed a gamma transition ($T_\delta$) temperature at −101° C. and storage modulus (G′) of $1.44 \times 10^{10}$ dynes/cm$^2$ at 25° C.

EXAMPLE 4

The yellow brown colored 1-methylethenyl terminated polystyrylpyridine prepolymer (4.04 g) prepared in Example 1 and 1,1′-(methylenedi-4,1-phenylene)bismaleimide (4.04 g) were pulverized and mixed with a mortar and pestle giving a yellow powder. This yellow powder was oven cured under full vacuum between 108°–172° C. for 11 minutes (660 s). The resultant partially cured copolymer was crushed with a mortar and pestle and sieved with a U.S.A. Standard Testing Sieve No. 40 to give a mustard yellow powder. The yellow powder softened between 127°–203° C. This powder was compression molded between 202°–222° C. and 4350–4600 psi (29,993–31,717 kPa) for 61 minutes (3660 s) and then between 249°–277° C. and 4400–4520 psi (30,338–31,165 kPa) for 62 minutes (3720 s) with a Carver Laboratory press as described in Example 2. Thermogravimetric analysis of the cured dark brown copolymer in nitrogen showed 5% weight loss at 398° C. and 55.7% weight loss at 950° C. In air, the copolymer lost 5% weight at 382° C.

EXAMPLE 5

The yellow brown colored 1-methylethenyl terminated polystyrylpyridine prepolymer (48.2 g) described in Example 1 was dissolved in tetrahydrofuran (49.8 g) by heating to a slight boil on a hot plate. The tetrahydrofuran solution of 1-methylethenyl terminated prepolymer was brushed onto a 14″×14″ (35.6 cm×35.6 cm) woven graphite fiber mat (Hercules AP193 dry cloth) clamped to a frame. The graphite fiber mat preimpregnate was allowed to dry overnight at room temperature. Then it was dried in an oven under full vacuum between 102°–242° C. for 92 minutes (5520 s). The tan prepolymer scrapped off the graphite fiber mat preimpregnate soften between 214°–264° C. Nine 4″×4″ (10.1×10.1 cm) sections were cut from the graphite fiber mat preimpregnate, layed up on top of one another and then compression molded between 222°–249° C. and 2520–2980 psi (17,375–20,547 kPa) for 65 minutes (3900 s) and then between 257°–279° C. and 2690–2830 psi (18,548–19,513 kPa) for 115 minutes (6900 s) with a Carver Laboratory press. The finished composite had thoroughly fused giving a dark brown rigid sample after trimming. Thermogravimetric analysis of the graphite composite in nitrogen showed 5% weight loss at 470° C. and 30.6% weight loss at 950° C. The composite lost 5% weight at 408° C. in air.

COMPARATIVE EXPERIMENT A 2,4,6-Trimethylpyridine (181.5 g, 1.5 moles), terephthaldicarboxaldehyde (301.5 g, 2.25 moles) and acetic acid (270 g, 4.5 moles) were weighed into a 2 liter resin kettle equipped with an immersion thermometer, mechanical stirrer, nitrogen gas purge system and condenser. After the reactants were deoxygenated by stirring for at least five minutes (300 s) in a nitrogen atmosphere, acetic anhydride (459 g, 4.5 moles) was added to the resin kettle. The reactants were heated between 127°–140° C. for 6 hours 20 minutes (22,800 s). Then the reaction mixture was cooled to room temperature and 2-methyl-5-vinylpyridine (268 g, 2.25 moles) was added to the resin kettle. The reactor contents were heated between 119°–125° C. for an additional 10 hours (36,000 s). The cooled reactor contents were neutralized with an aqueous solution of 10 wt/wt% of sodium hydroxide (2050 ml). The sodium hydroxide solution was decanted, warm water (1600 ml) added to the 2-methyl-5-vinylpyridine terminated polystyrylpyridine prepolymer and the water decanted. The 2-methyl-5-vinylpyridine terminated polystyrylpyridine prepolymer (654 g) was dissolved into tetrahydrofuran (4600 g). The tetrahydrofuran solution of the prepolymer was filtered. The prepolymer was precipitated from the tetrahydrofuran solution by the addition of the tetrahydrofuran solution into water. The solid powdery product was again water washed before drying in an oven under full vacuum between 75°–80° C. The infrared spectrum of the powder showed a band at 970 cm$^{-1}$ which indicates the presence of trans unsaturation and a band at 910 cm$^{-1}$ which is characteristic of =CH$_2$ wagging frequency for a vinyl group (R—CH=CH$_2$). The 2-methyl-5-vinylpyridine terminated polystyrylpyridine prepolymer melted between 90°–105° C. The 2-methyl-5-vinylpyridine prepolymer was pulverized and then molded between 175°–215° C. and 4000–6000 psi (27,580–41,370 kPa) for 2 hours 55 minutes (10,500 s) with a Carver Laboratory press as described in Example 2. The molded polymer was post cured for 12 hours (43,200 s). Dynamic mechanical analysis showed a gamma transition (T$_\delta$) temperature at $-70°$ C. and storage modulus (G') of $1.02 \times 10^{10}$ dynes/cm$^2$ at 25° C. The flexural modulus was calculated to be 443,813 psi (3060 MPa) from the storage modulus using the equation of Young's modulus. The storage or flexural modulus of the post cured 2-methyl-5-vinylpyridine terminated polystyrylpyridine is 8.1% less than the storage or flexural modulus of the molded 4-(1-methylethenyl)-1-cyclohexene-1-carboxaldehyde terminated polystyrylpyridine.

I claim:

1. A thermosettable composition which results from reacting
   (A) a pyridine compound containing at least two substituent groups which have at least one hydrogen atom attached to a carbon atom which is attached to the ring or mixture of such pyridines;
   (B) at least one material having at least two aldehyde groups; and
   (C) at least one aldehyde containing at least one polymerizable unsaturated group;
   wherein components (A), (B) and (C) are employed in quantities which provide a mole ratio of (C):(B):(A) of from about 0.25:0.25:1 to about 4:4:1.

2. A composition of claim 1 wherein the mole ratio of (C):(B):(A) is from about 0.5:0.5:1 to about 1.5:1.5:1.

3. A composition of claim 2 wherein component (A) is 2,5-dimethylpyridine, 2,3,4-trimethylpyridine, 2,3,5-trimethylpyridine, 2,3,6-trimethylpyridine, 2,4,5-trimethylpyridine, 2,3,5,6-tetramethylpyridine, pentamethylpyridine or combination thereof; component (B) is terephthaldicarboxaldehyde, or a mixture of terephthaldicarboxaldehyde and benzaldehyde or combination thereof; and component (C) is 4-(1-methylethenyl)-1-cyclohexene-1-carboxaldehyde, or combination thereof.

4. A composition which results from curing a composition of claim 1 by heat and pressure.

5. A composition which results from curing a composition of claim 2 by heat and pressure.

6. A composition which results from curing a composition of claim 3 by heat and pressure.

7. A composition which results from curing a composition of claim 1 by polymerization in the presence of or copolymerization with an N,N'-bis-imide.

8. A composition of claim 7 wherein said N,N'-bisimide is 1,1'-(methylenedi-4,1-phenylene)-bismaleimide, a resin represented by the formula

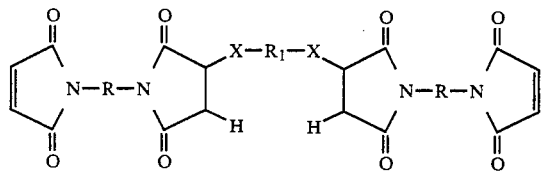

wherein R is an aromatic ring and X-R$_1$-X is a Michael addition coupling group, a "eutectic" mixture of the compounds represented by the formulas

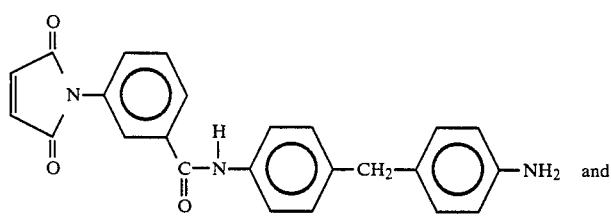

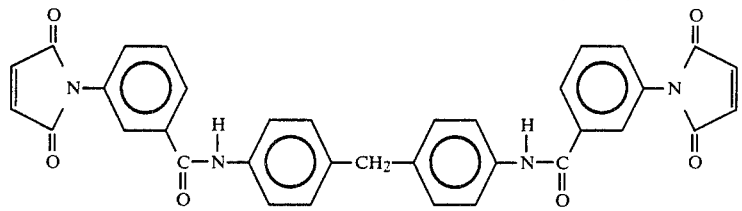

or a combination thereof.

9. A composition which results from curing a composition of claim 2 by polymerization in the presence of or copolymerization with an N,N'-bis-imide.

10. A composition of claim 9 wherein said N,N'-bis-imide is 1,1'-(methylenedi-4,1-phenylene)-bis-maleimide, a resin represented by the formula

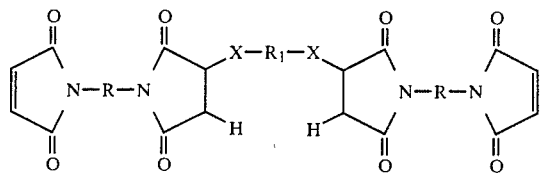

wherein R is an aromatic ring and X-$R_1$-X is a Michael addition coupling group, a "eutectic" mixture of the compounds represented by the formulas

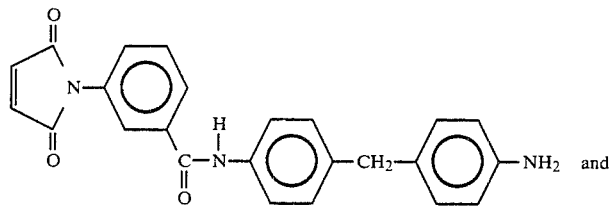

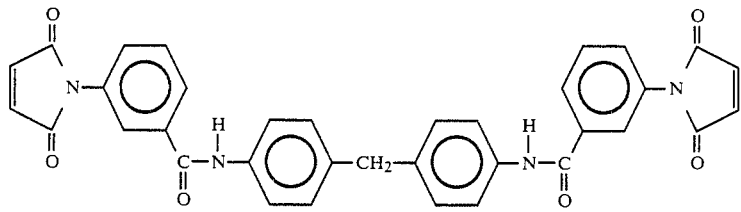

or a combination thereof.

11. A composition which results from curing a composition of claim 3 by polymerization in the presence of or copolymerization with an N,N'-bis-imide.

12. A composition of claim 11 wherein said N,N'-bis-imide is 1,1'-(methylenedi-4,1-phenylene)bis-maleimide, a resin represented by the formula

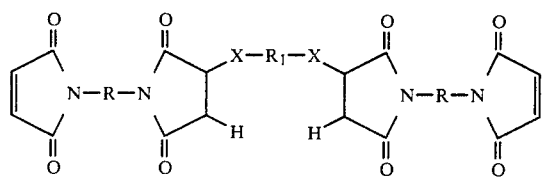

wherein R is an aromatic ring and X-$R_1$-X is a Michael addition coupling group, a "eutectic" mixture of the compounds represented by the formulas

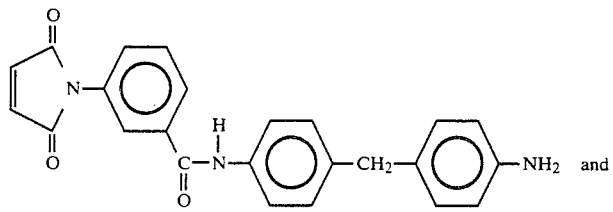

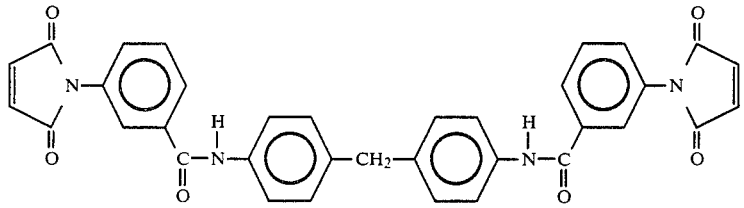

or a combination thereof.

13. A composition of claim 4 which contains a reinforcing material.

14. A composition of claim 5 which contains a reinforcing material.

15. A composition of claim 6 which contains a reinforcing material.

16. A composition of claim 7 which contains a reinforcing material.

17. A composition of claim 8 which contains a reinforcing material.

18. A composition of claim 9 which contains a reinforcing material.

19. A composition of claim 10 which contains a reinforcing material.

20. A composition of claim 11 which contains a reinforcing material.

21. A composition of claim 12 which contains a reinforcing material.

* * * * *